(12) United States Patent
He et al.

(10) Patent No.: US 8,842,551 B2
(45) Date of Patent: Sep. 23, 2014

(54) METHOD AND APPARATUS FOR TRANSMITTING/RECEIVING HYBRID AUTOMATIC REPEAT REQUEST FAILURE INDICATION

(75) Inventors: Meifang He, Shenzhen (CN); Xiang Cheng, Shenzhen (CN); Yu Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 88 days.

(21) Appl. No.: 13/259,002

(22) PCT Filed: Jan. 5, 2010

(86) PCT No.: PCT/CN2010/070024
§ 371 (c)(1),
(2), (4) Date: Feb. 7, 2012

(87) PCT Pub. No.: WO2011/020306
PCT Pub. Date: Feb. 24, 2011

(65) Prior Publication Data
US 2012/0127867 A1    May 24, 2012

(30) Foreign Application Priority Data
Aug. 18, 2009  (CN) .......................... 2009 1 0166179

(51) Int. Cl.
H04L 1/16  (2006.01)
H04L 1/18  (2006.01)
(52) U.S. Cl.
CPC .............. *H04L 1/1607* (2013.01); *H04L 1/1812* (2013.01)
USPC ........................................................ 370/242
(58) Field of Classification Search
CPC ............................... H04W 28/04; H04W 26/00
See application file for complete search history.

(56) References Cited

U.S. PATENT DOCUMENTS

| 2006/0187844 A1* | 8/2006 | Chun et al. ..................... 370/242 |
| 2008/0026741 A1 | 1/2008 | Nakamata |
| 2008/0273454 A1* | 11/2008 | Malkamaki et al. .......... 370/216 |
| 2008/0287068 A1 | 11/2008 | Etemad |
| 2012/0002610 A1* | 1/2012 | Widegren et al. ............. 370/328 |

FOREIGN PATENT DOCUMENTS

| CN | 101069369 A | 11/2007 |
| CN | 101494642 A | 7/2009 |
| JP | 2008529437 A | 7/2008 |
| JP | 2011160450 A | 8/2011 |
| WO | 2006085174 A1 | 8/2006 |
| WO | 2007088486 A2 | 8/2007 |

OTHER PUBLICATIONS

HARQ Failure Indication Feb. 2005.

(Continued)

*Primary Examiner* — Huy D Vu
*Assistant Examiner* — Bao G Nguyen
(74) *Attorney, Agent, or Firm* — Oppedahl Patent Law Firm LLC

(57) ABSTRACT

The present application discloses a method and apparatus for transmitting/receiving an HARQ failure indication. The method includes: a Node B receives an E-DCH payload from a primary carrier and fails to decode it; the Node B determines whether the condition of transmitting an HARQ failure indication is met, if so, the Node B sets the HARQ failure indication data frame on the primary carrier; and the Node B transmits the HARQ failure indication data frame to a service radio network controller on a transmission bearer corresponding to the primary carrier. The present application realizes a better control over the SIR target value through a carrier-based outer loop power control function.

6 Claims, 9 Drawing Sheets

(56) References Cited

OTHER PUBLICATIONS

International Search Report in international application No. PCT/CN2010/070024, mailed on May 27, 2010.

English Translation of the Written Opinion of the International Search Authority in international application No. PCT/CN2010/070024, mailed on May 27, 2010.

* cited by examiner

METHOD AND APPARATUS FOR TRANSMITTING/RECEIVING HYBRID AUTOMATIC REPEAT REQUEST FAILURE INDICATION

TECHNICAL FIELD

The present application relates to the field of communications, and particularly to a method and an apparatus for transmitting/receiving a Hybrid Automatic Repeat Request (HARQ) failure indication.

BACKGROUND

In an existing communication system, when there is data to be transmitted, data frames are transmitted from a Service Radio Network Controller (SRNC) to a Node B through downlink transmission and are transmitted from the Node B to the SRNC through uplink transmission in each transmission interval at a Iub interface (which is an interface between a Node B and an SRNC) and a Iur interface (which is an interface between an SRNC and a Radio Network Controller (RNC)). An Enhanced Dedicated Transport Channel (E-DCH) data frame is of a data frame type, which is used for uplink and involved in through an upper-layer signaling indication. The E-DCH data frames are defined as two structures: type 1 and type 2. If a Medium Access Control-enhanced sublayer Protocol Data Unit (MAC-es PDU) is involved, the structure of the type 1 is used; and if a Medium Access Control-improved sublayer Protocol Data Unit (MAC-is PDU) is involved, the structure of the type 2 is used.

FIG. 1 is a schematic diagram of E-DCH uplink data frame formats according to related technologies. As shown in FIG. 1, the E-DCH data frame of the type 1 (as shown in FIG. 1(*a*)) and type 2 (as shown in FIG. 1(*b*)) have two components: a head and a payload, both of which include the following domains, but include different types of data units:

1. Head Cyclical Redundancy Check (CRC) Code Domain the "CRC code" domain is that the check code applied to a head redundancy frame part (i.e., from 0 of the first byte to 0 of the last byte of the head, including 0 in the last byte but not including the last 4 bits of the head CRC, i.e., the 7th to 4th bits of the second byte) corresponds to the check code of a generator formula; the "head CRC code" domain length of the E-DCH uplink data frame is 7 or 11 bits; the 7 bits include the 7th to 1st bits of the first byte in the E-DCH data frame head; and the 11 bits include the 7th to 1st bits of the first byte as well as the 7th to 4th bits of the second byte;

2. Frame Type Indication the "frame type indication" domain is used for indicating whether the frame is a data frame or a control frame; the length of the "frame type" domain is one bit which locates at the bit 0 of the first byte of the E-DCH data frame head; the E-DCH data frame is an uplink data frame, so the "frame type indication" domain indicates 0;

3. Frame Sequence Number (FSN)

the "FSN" domain represents the FSN of an E-DCH data frame; E-DCH data frames transmitted each time will generate their own FSNs; and a 4-bit FSN is calculated according to the following formula:

$$FSN=(FSN+1) \bmod{16}$$

the FSN value is in the range of 0-15; the length of the "FSN" domain is 4 bits which locates from bit 3 to bit 0 of the second byte of the E-DCH data frame head;

4. The Number of Subframes

"the number of subframes" domain indicates how many subframes are in the frame; it is noted that a subframe includes a head part and a payload part; the value of the "the number of subframes" domain is in the range from 1 to 16; the binary codes of value 1 and value 16 are "0000" and "1111" respectively; and the length of "the number of subframes" domain is 4 bits which locates from bit 3 to bit 0 of the third byte of the E-DCH data frame head;

5. Connection Frame Number (CFN)

for the E-DCH, the "connection frame number" domain indicates a radio frame where data are decoded correctly in an HARQ process; for the E-DCH, the CFN (and sub-frame number) can be used for a dynamical delay measurement besides for rearrangement, with a value range from 0 to 255; the length of the "CFN" domain is 8 bits which locates from the bit 7 to bit 0 of the fourth byte of the E-DCH data frame head;

6. The Number of HARQ Retransmissions

"the number of HARQ retransmissions" domain indicates the number of HARQ retransmissions for successfully decoding payloads, or the number of HARQ retransmissions when a HARQ decoding failure is detected in the case where an HARQ decoding failure occurs; and when the value of the domain is 13, it indicates that the retransmitted actual data are not suitable for serving as an input of an Outer Loop Power Control (OLPC); when the value of the domain is 15, it indicates that the Node B cannot calculate the number of HARQ retransmissions; and the value of the domain is in the range from 0 to 15; the length of the "the number of HARQ retransmissions" domain is 4 bits which locates from the bit 3 to bit 0 of the fifth byte of the E-DCH data frame head; "the number of HARQ retransmissions" domain of the first subframe number locates from the bit 6 to bit 3 of the fifth byte of the E-DCH data frame head; "the number of HARQ retransmissions" domain of the second subframe number locates from the bit 6 to bit 3 in the first byte after the first MAC-e head of the E-DCH data frame head; the locations of "the number of HARQ retransmissions" domains of other subframe numbers in the E-DCH data frame head can be deduced by analogy, till the subframe include the number of HARQ retransmissions of all the MAC-es PDUs.

7. Subframe Number the "subframe number" domain indicates the subframe number where the received payload locates; the subframe number (and control frame number) can be used for a dynamical delay measurement besides for rearrangment; the "subframe number" domain is in the value range from 0 to 4 and the length is 3 bits; the first subframe number locates from the bit 2 to bit 0 of the fifth byte of the E-DCH data frame head; the second subframe number locates from the bit 2 to bit 0 in the first byte after the first MAC-e or MAC-i head of the E-DCH data frame head; and other subframe numbers locate from the bit 2 to bit 0 in the first byte after the previous MAC-e or MAC-i head of the E-DCH data frame head till all the subframe numbers are included;

8. Residual Extension the "residual extension" domain indicates the locations of new Information Elements (IEs) to be added in a backward compatibility manner; the length of the domain is 0-32 bytes;

9. Payload CRC the "payload CRC" domain is a CRC check of a payload; the CRC is applied to the residual part of the payload, i.e., from the bit 7 of the first byte of the payload to the bit 0 of the payload before the payload CRC; the length of the domain is 16 bits.

If an E-DCH payload is decoded successfully, the E-DCH data frame is written in abovementioned format and transmitted to an SRNC by a Node B.

If the E-DCH payload fails to be decoded and meets any one of the following conditions, the service Node B will transmit an HARQ failure indication to the SRNC (non-service Node B will not transmit an HARQ failure indication):

condition 1: for an HARQ process, an MAC-e or MAC-i PDU cannot be successfully decoded, and a Retransmission Sequence Number (RSN) indicates a new MAC-e or MAC-i PDU transmission used for the same HARQ process, and the number of HARQ retransmissions having happened is equal to or higher than the minimum value of the maximal HARQ retransmission value of the MAC-d flow configured by a terminal;

condition 2: for an HARQ process, an MAC-e or MAC-i fails to be decoded all the time and the maximal retransmission of an MAC-dedicated (MAC-d) flow in the maximal retransmission of the highest HARQ which is available to the terminal connection occurs, or under the condition that an out-of-band signalling (such as an RSN) related to the HARQ on an E-DCH Dedicated Physical Control Channel (E-DPCCH) cannot be decoded, the maximal retransmission of an MAC-d flow in the maximal retransmission of the highest HARQ which is available to the terminal connection should occur;

condition 3: when the MAC-e or MAC-i is reset on a terminal, an MAC-e or MAC-i in an HARQ process fails to be decoded all the time; a Node B acquires the resetting time point of the MAC-e or MAC-i in the terminal through an upper layer.

An HARQ failure indication is transmitted only in one transmission bearer. The Node B selects any transmission bearer associated with the terminal related to an HARQ failure indication.

An HARQ failure, which is indicated in a user data frame, is called an HARQ failure indication data frame, the concrete setting is as follows; FIG. 2 is a schematic diagram of an HARQ failure indication data frame format according to related technologies. As shown in FIG. 2:

1. when a failure is detected, the IEs values of a connection frame number and a subframe number will reflect a time point;

2. type 1 is shown in FIG. 2a: the number of MAC-es PDUs will be set as 0, wherein there is correspondingly no IEs of DDI and N in the head; and for the alignment of 8 bytes, the last 4 padding bits of the IEs of the MAC-es PDU are used and there is no MAC-es PDU in the payload part of the data frame related to the HARQ failure;

3. type 2 is shown in FIG. 2b: the number of the MAC-is PDUs will be set as 0, wherein there is correspondingly no IEs of the MAC-is protocol data descriptor in the head; and there is no MAC-is PDU in the payload part of the data frame related to the HARQ failure;

4. the IE of the number of HARQ retransmissions will be set as the number of HARQ retransmissions which have happened when the failure is detected, wherein the encoding method is the same as the method of correctly decoding the payload described above.

The SRNC decodes a received, correctly decoded E-DCH data frame head to obtain the number of HARQ retransmissions, and takes it as an input of the OLPC, or decodes an E-DCH data frame head of the HARQ failure indication to obtain the number of HARQ retransmissions and takes it as an input of the OLPC. If the output Signal Interference Ratio (SIR) of the OLPC is modified, the SRNC includes a new SIR target in an OLPC frame and transmits it to the Node B. An inner loop power control function at the Node B will control the power transmission of the terminal through a new SIR target value so as to minimize interference and maintain connection quality.

Along with technology development, it is desired to introduce a dual-carrier technology (which makes a terminal able to transmit data over two carriers so as to double an uplink data rate) into the existing system; furthermore, each carrier has an independent transmission bearer at a Iub interface/Iur interface. If the existing HARQ failure indication is used, there are the following problems:

since the Node B receives an MAC-es PDU or MAC-is PDU on two carriers from a terminal at an air interface, it is possible that the data on the two carriers fails to be decoded at the same time or the data on one carrier is decoded successfully while the other fails; however, the HARQ failure indication in the prior art aims at the decoding failure of the MAC-es PDU or MAC-is PDU on one carrier; the HARQ failure indication has no carrier characteristics and is transmitted to the Node B from any one of transmission bearers connected with the terminal; if both of the MAC-e PDU and the MAC-i PDU received by the Node B from two carriers fail to be decoded, or one from one carrier thereof fails to be decoded, this failure is transmitted to the Node B by using an existing HARQ failure indication data frame over any one of the transmission bearers connected with the terminal; both the HARQ failure indication data frame and the transmission bearer cannot tell which carrier the number of HARQ retransmissions belongs to, so the SRNC cannot know the number of retransmissions of the data flow on each carrier; at the same time, the OLPC is calculated based on the HARQ retransmitted data of the E-DCH frame protocol data frame head or the HARQ retransmitted data of the HARQ failure indication data frame head, so the OLPC also cannot realize the function thereof.

SUMMARY

The present application is provided for solving the problem that it can not be known which carrier the number of HARQ retransmissions belongs to according to an HARQ failure indication data frame and a transmission bearer in related technologies; therefore, the main objective of the present application is to provide a scheme for transmitting/receiving an HARQ failure indication for solving the problem.

In order to fulfill the objective, according to an aspect of the present application, a method for transmitting an HARQ failure indication is provided, which is applied to a process of transmitting data flows of primary carrier and secondary carrier on independent transmission bearers of a Iub interface/Iur interface respectively.

The method for transmitting an HARQ failure indication includes: a Node B receives an E-DCH payload from the primary carrier and fails to decode it; the Node B determines whether a condition for transmitting an HARQ failure indication is met, if it is met, the Node B sets an HARQ failure indication data frame on the primary carrier; and the Node B transmits the HARQ failure indication data frame to an SRNC on a transmission bearer corresponding to the primary carrier.

Preferably, the setting an HARQ failure indication data frame on the primary carrier may include: setting a CFN domain and a subframe number domain as a CFN and subframe number when detecting an HARQ failure indication; if the data frame is of type 1, setting a number domain of MAC-es PDUs as 0; if the data frame is of type 2, setting the number domain of MAC-is PDUs as 0; and setting a number domain of HARQ retransmissions as the number of HARQ retransmissions having happened when an HARQ failure indication is detected.

In order to fulfill the aim, according to an aspect of the present application, a method for transmitting an HARQ failure indication is provided, the method is applied to a process of transmitting data flows of a primary carrier and a secondary carrier on independent transmission bearers of a Iub interface/Iur interface respectively.

The method for transmitting an HARQ failure indication includes: a Node B receives an E-DCH payload from the secondary carrier and fails to decode it; the Node B determines whether a condition for transmitting an HARQ failure indication is met, if it is met, the Node B sets an HARQ failure indication data frame on the secondary carrier; and the Node B transmits the HARQ failure indication data frame to an SRNC on a transmission bearer corresponding to the secondary carrier.

Preferably, the setting an HARQ failure indication data frame on the secondary carrier may include: setting a CFN domain and a subframe number domain as a CFN and a subframe number when detecting an HARQ failure indication; if the data frame is of type 1, setting a number domain of MAC-es PDUs as 0; if the data frame is of type 2, setting a number domain of MAC-is PDUs as 0; and setting a number domain of HARQ retransmissions as the number of HARQ retransmissions having happened when an HARQ failure indication is detected.

In order to fulfill the aim, according to an aspect of the present application, a method for receiving an HARQ failure indication is provided, the method is applied to a process of transmitting data flows of a primary carrier and a secondary carrier on independent transmission bearers of a Iub interface/Iur interface respectively.

The method for receiving an HARQ failure indication includes: an SRNC receives an HARQ failure indication data frame from a Node B on a transmission bearer corresponding to the primary carrier and acquires information of the HARQ failure indication data frame of the primary carrier corresponding to the transmission bearer of the Iub interface/Iur interface from the HARQ failure indication data frame.

Preferably, the SRNC acquiring information of the HARQ failure indication data frame of the primary carrier corresponding to the transmission bearer of the Iub interface/Iur interface from the HARQ failure indication data frame may include: the SRNC acquires a CFN of the primary carrier from a CFN domain of the HARQ failure indication data frame; the SRNC acquires a subframe number of the primary carrier from a subframe number domain of the HARQ failure indication data frame; and the SRNC acquires the number of HARQ retransmissions occurring on the primary carrier at an HARQ failure moment indicated by the CFN and the subframe number from a number domain of HARQ retransmissions in the HARQ failure indication data frame.

In order to fulfill the aim, according to another aspect of the present application, a method for receiving an HARQ failure indication is provided, the method is applied to a process of transmitting data flows of a primary carrier and a secondary carrier on independent transmission bearers of a Iub interface/Iur interface respectively.

The method for receiving an HARQ failure indication includes: an SRNC receives an HARQ failure indication data frame from a Node B on a transmission bearer corresponding to the secondary carrier and acquires information of the HARQ failure indication data frame of the secondary carrier corresponding to the transmission bearer of the Iub interface/Iur interface from the HARQ failure indication data frame.

Preferably, the SRNC acquiring information of the HARQ failure indication data frame of the secondary carrier corresponding to the transmission bearer of the Iub interface/Iur interface from the HARQ failure indication data frame may include: the SRNC acquires a CFN of the secondary carrier from a CFN domain of the HARQ failure indication data frame; the SRNC acquires a subframe number of the secondary carrier from a subframe number domain of the HARQ failure indication data frame; and the SRNC acquires the number of HARQ retransmissions occurring on the secondary carrier at an HARQ failure moment indicated by the CFN and the subframe number from number domain of HARQ retransmissions in the HARQ failure indication data frame.

To fulfill the aim, according to another aspect of the present application, a Node B is provided.

The Node B includes: a receiving module for receiving an E-DCH payload from a primary carrier or a secondary carrier, wherein data flows of the primary carrier and the secondary carrier are transmitted on independent transmission bearers of a Iub interface/Iur interface respectively; a determination module for determining whether a condition for transmitting an HARQ failure indication is met under the condition that the E-DCH payload received by the receiving module fails to be decoded; a setting module for setting an HARQ failure indication data frame on the primary carrier or the secondary carrier under the condition that the determination result from the determination module is yes; and a transmitting module for transmitting the HARQ failure indication data frame set by the setting module to an SRNC on a transmission bearer corresponding to the primary carrier or secondary carrier.

To fulfill the aim, according to another aspect of the present application, an SRNC is provided.

The SRNC includes: a receiving module for receiving an HARQ failure indication data frame from a Node B on a transmission bearer corresponding to a primary carrier or a secondary carrier; and an acquisition module for acquiring information of the HARQ failure indication data frame of the primary carrier or the secondary carrier corresponding to the transmission bearer of a Iub interface/Iur interface from the HARQ failure indication data frame received by the receiving module.

In the present application, by the method for transmitting by a Node B an HARQ failure indication data frame to the SRNC on the transmission bearer corresponding to the primary carrier or the secondary carrier, the problem that it can not be known which carrier the number of HARQ retransmissions belongs to according to the HARQ failure indication data frame and a transmission bearer in related technologies is solved, thus a better control over SIR Target is realized through a carrier-based OLPC function.

BRIEF DESCRIPTION OF THE DRAWING

The drawings herein are used for further understanding of the present application and are a part of the present application, and the schematic embodiments and description of the present application are used for explaining the present application but not for limiting the present application. In the drawings.

DETAILED DESCRIPTION

Function Summary

Figure 1A:
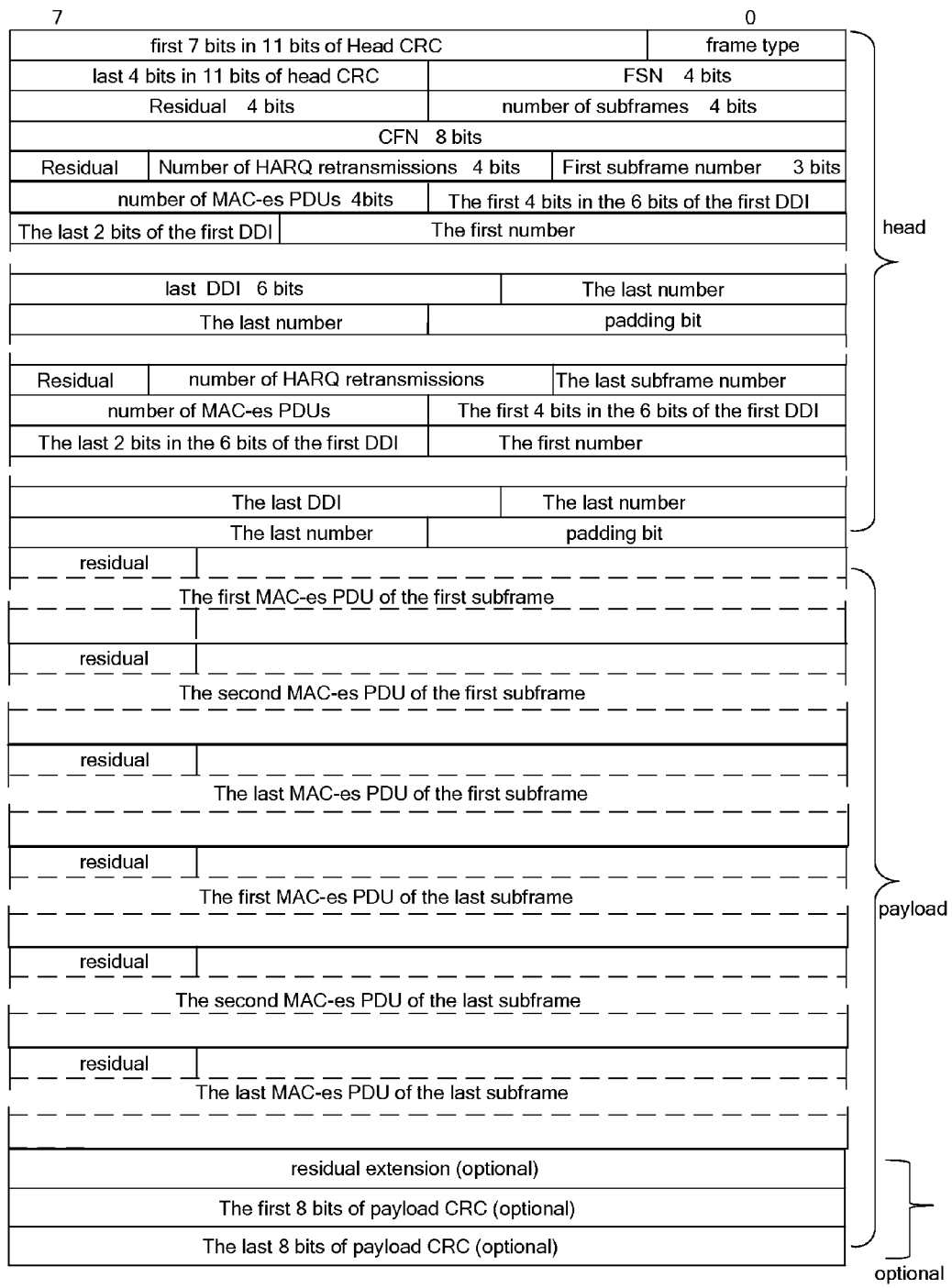
FIG. 1 is a schematic diagram of an E-DCH uplink data frame format according to related technologies.
Figure 1B:
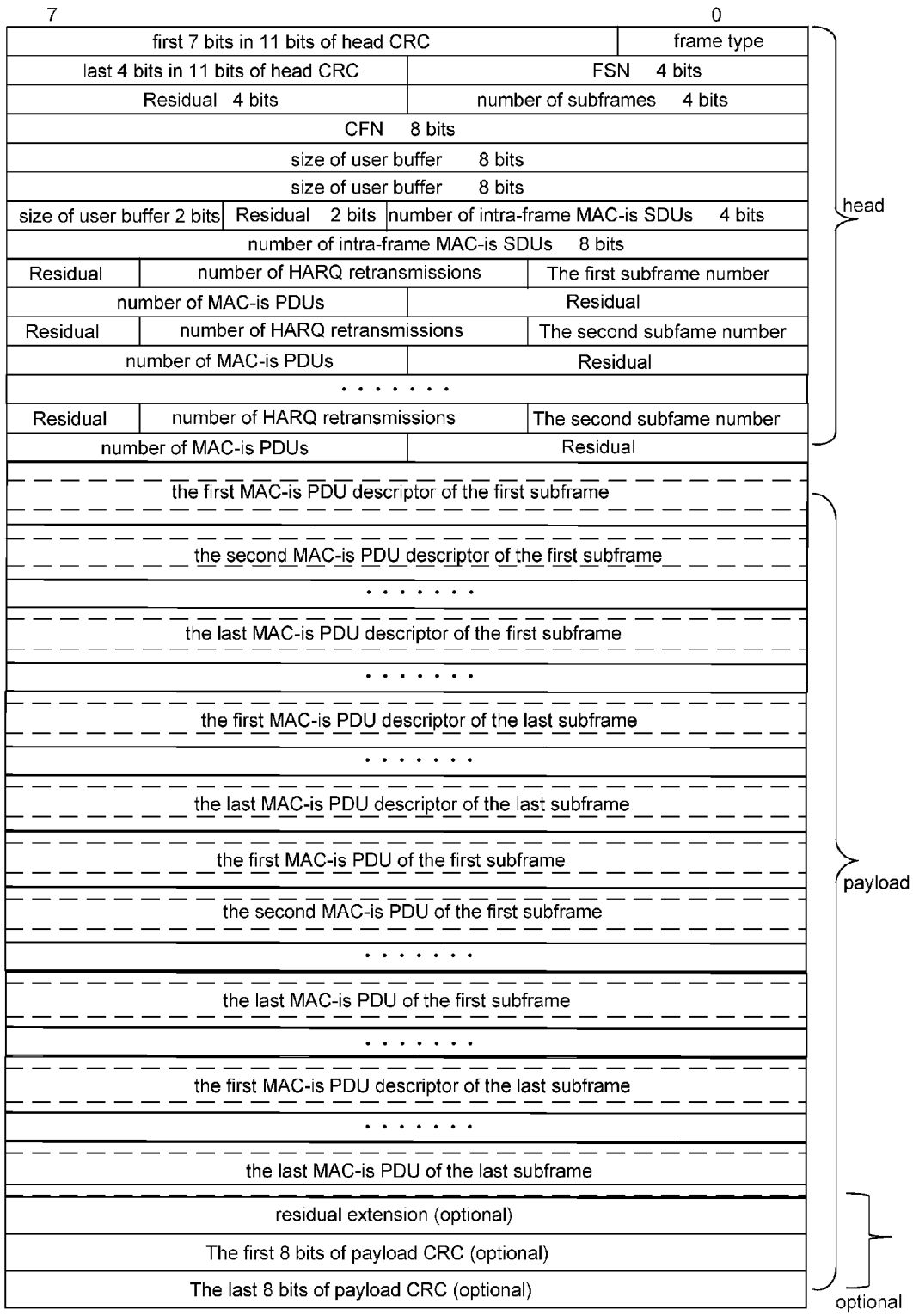
Figure 2A:
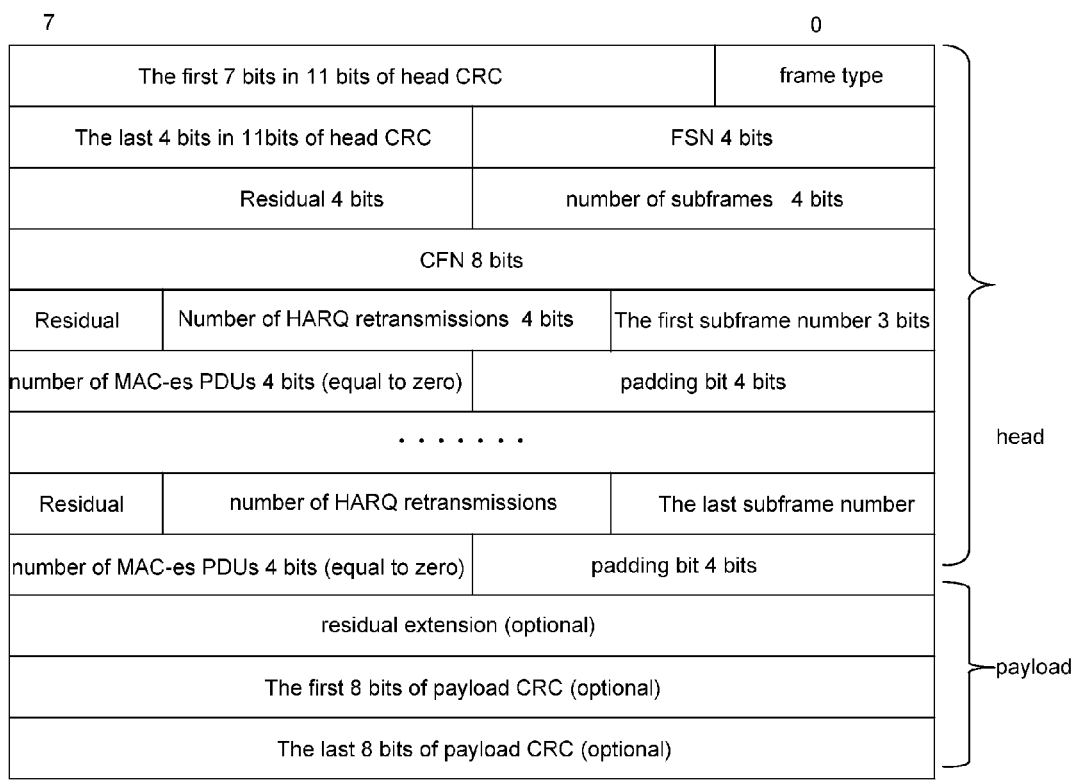
FIG. 2 is a schematic diagram of an HARQ failure indication data frame format according to related technologies.
Figure 2B:
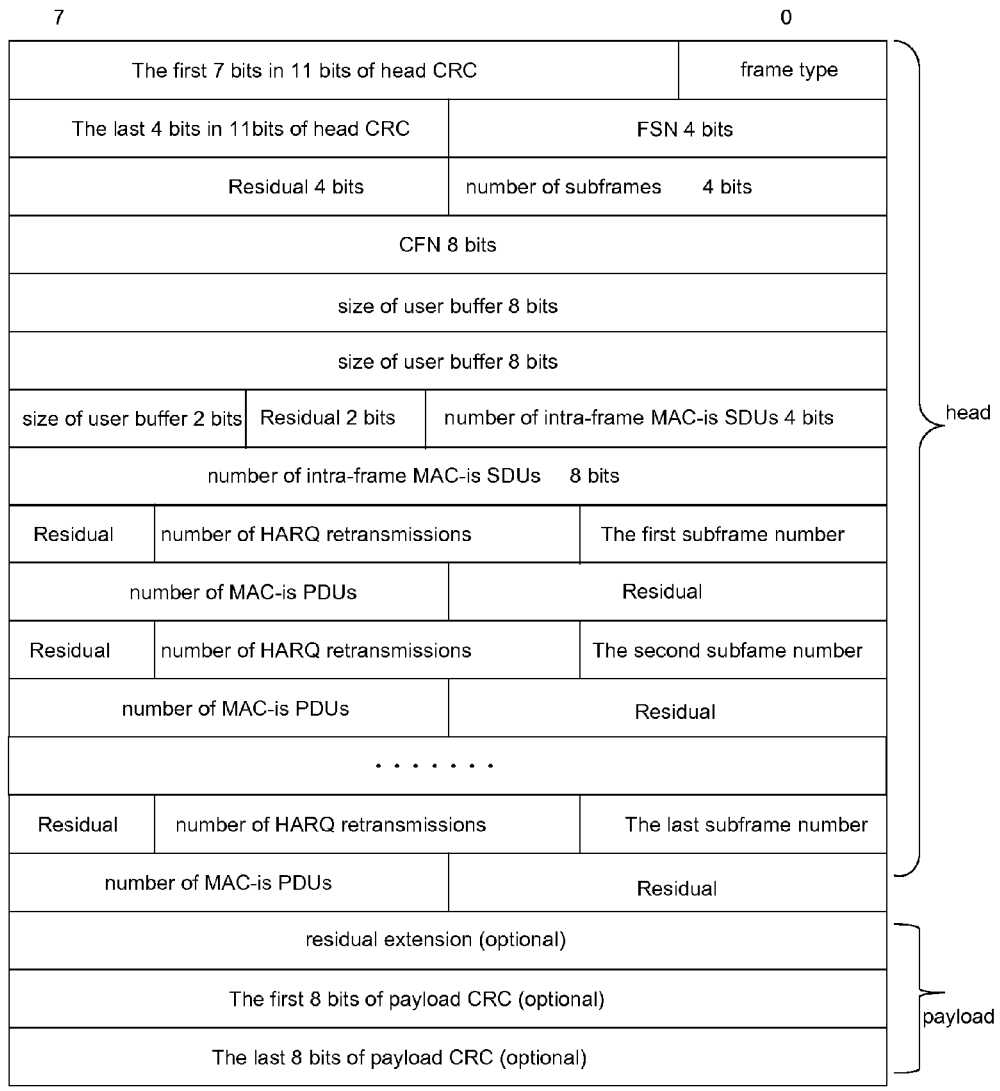

Considering it can not be known which carrier the number of HARQ retransmissions belongs to according to an HARQ failure indication data frame and a transmission bearer in related technologies, the present application provides a scheme for transmitting/receiving an HARQ failure indication, which is used for: transmitting and receiving an HARQ failure indication when transmitting data on dual carriers through a High-Speed Packet Access (HSPA) technology in a radio communication system, transmitting an HARQ failure indication corresponding to each carrier, binding the HARQ failure indication with a transmission bearer corresponding to a carrier and transmitting the HARQ failure indication over the transmission bearer corresponding to the carrier through an HARQ failure indication data frame of an Iub interface/Iur interface and further transmitting it to an SRNC. In this way, the SRNC can know the number of HARQ retransmissions when an HARQ failure indication occurs on each carrier, thus the value of Signal to Interference Ratio Target (SIR Target) can be controlled better through a carrier-based OLPC function.

It should be explained that, if not conflicted, the embodiments and features thereof in the present application can be combined with each other. The present application will be explained below in detail with reference to the drawings and in conjunction with the embodiments.

In the following embodiments of the present application, a terminal can transmit data on two carriers through a High-Speed Uplink Packet Access (HSUPA) technology. For the terminal, dual carriers include a High Speed-Dedicated Physical Control Channel (uplink) for HS-DSCH (HS-DPCCH), wherein the carrier of the High Speed-Downlink Shared Channel (HS-DSCH) is a primary carrier, and the other carrier of the dual carriers is a secondary carrier.

METHOD EMBODIMENT

According to the embodiments of the present application, a method for transmitting an HARQ failure indication is provided and applied to a processing procedure at a Node B, specifically to a process of transmitting data flows of primary and secondary carriers on independent transmission bearers of an Iub interface/Iur interface respectively; if the E-DCH payload fails to be decoded and one of the three conditions for transmitting an HARQ failure indication described in the background technology is met, a service Node B will transmit the HARQ failure indication to an SRNC, specifically including the following steps 1 to 4:

step 1: the Node B receives an E-DCH payload from a carrier (primary/secondary) at an air interface, wherein the payload cannot be decoded successfully;

step 2: the Node B determines whether the condition for transmitting an HARQ failure indication is met, if it is met, step 3 is executed, otherwise, the flow is ended; and step 3: the Node B sets an HARQ failure indication data frame on the carrier (primary/secondary) according to the following steps, wherein the encoding method is the same as the method of correctly decoding a payload:

(1) setting a CFN and a subframe number of the HARQ failure indication being subjected to detection into a CFN domain and a subframe number domain;

(2) if the data frame is of type 1: setting 0 into a number domain of MAC-es PDUs, wherein there is correspondingly no IEs of DDI and N in a data frame head; for the alignment of 8 bits, the last 4 padding bits of the IEs of the MAC-es PDU are used and there is also no MAC-es PDU in the payload part of the data frame related to the HARQ failure; or if the data frame is of type 2: setting 0 into a number domain of the MAC-is PDUs, wherein there is correspondingly no IEs of an MAC-is protocol data descriptor in the head, and there is no MAC-is PDU in the payload part of the data frame related to the HARQ failure;

(3) setting the number of HARQ retransmissions having happened when the HARQ failure indication is detected into an HARQ retransmission number domain;

step 4: the service Node B will transmit the HARQ failure indication data frame to the SRNC on a transmission bearer corresponding to the carrier (primary/secondary).

According to the embodiments of the present application, a method for receiving an HARQ failure indication is provided and applied to a processing procedure at the SRNC, specifically to a process of transmitting data flows of primary and secondary carriers in independent transmission bearers of the Iub interface/Iur interface respectively; and the method includes: the SRNC receives an HARQ failure indication data frame from the service Node B on a transmission bearer corresponding to the carrier (primary/secondary) and acquires information of the HARQ failure indication data frame of the carrier (primary/secondary) corresponding to the transmission bearer of the Iub interface/Iur interface from the HARQ failure indication data frame.

Specifically, the SRNC decodes the "CFN" domain of the frame to acquire the CFN of the carrier (primary/secondary) corresponding to the transmission bearer of the Iub interface/Iur interface; the SRNC decodes the "subframe number" domain of the frame to acquire the subframe number of the carrier (primary/secondary) corresponding to the transmission bearer of the Iub interface/Iur interface; and the SRNC decodes the "HARQ retransmission number" domain of the frame to acquire the number of HARQ retransmissions occurring at the HARQ failure moment indicated by the CFN and subframe number of the carrier (primary/secondary) corresponding to the transmission bearer of the Iub interface/Iur interface.

By the method of a Node B transmitting an HARQ failure indication data frame to an SRNC on a transmission bearer corresponding to a primary or secondary carrier, the present application solves the problem that it can not be known which carrier the number of HARQ retransmissions belongs to according to an HARQ failure indication data frame and a transmission bearer, and further realizes better control over SIR Target through a carrier-based OLPC function.

The realization process in the embodiments of the present application is described below in detail with reference to the embodiments.

Figure 3:
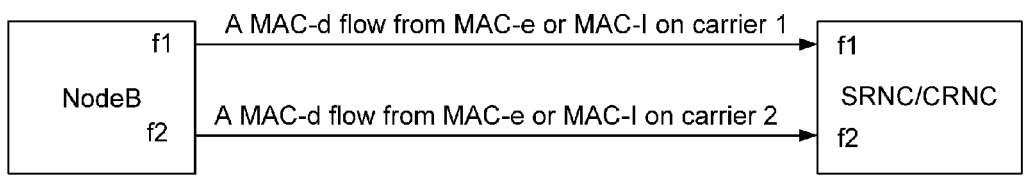
FIG. 3 is a schematic diagram of application scenarios according to the embodiments of the present application.

FIG. 3 is a schematic diagram of application scenarios according to the embodiments of the present application. As shown in FIG. 3, a terminal uses a dual-carrier technology which makes the terminal able to transmit data on two carriers and thus double an uplink data rate. In dual carriers, the carrier including an HS-DPCCH is a primary carrier and the other one is a secondary carrier. The data flows of the two carriers are transmitted on the independent transmission bearers of the Iub interface/Iur interface, i.e., the Node B transmits an MAC-d flow coming from an MAC-e or MAC-I on carrier 1 to an SRNC/Control Radio Network Controller (CRNC) through an f1 interface, and transmits an MAC-d flow coming from the MAC-e or MAC-I on carrier 2 to the SRNC/CRNC through an f2 interface.

Embodiment 1

Figure 4:
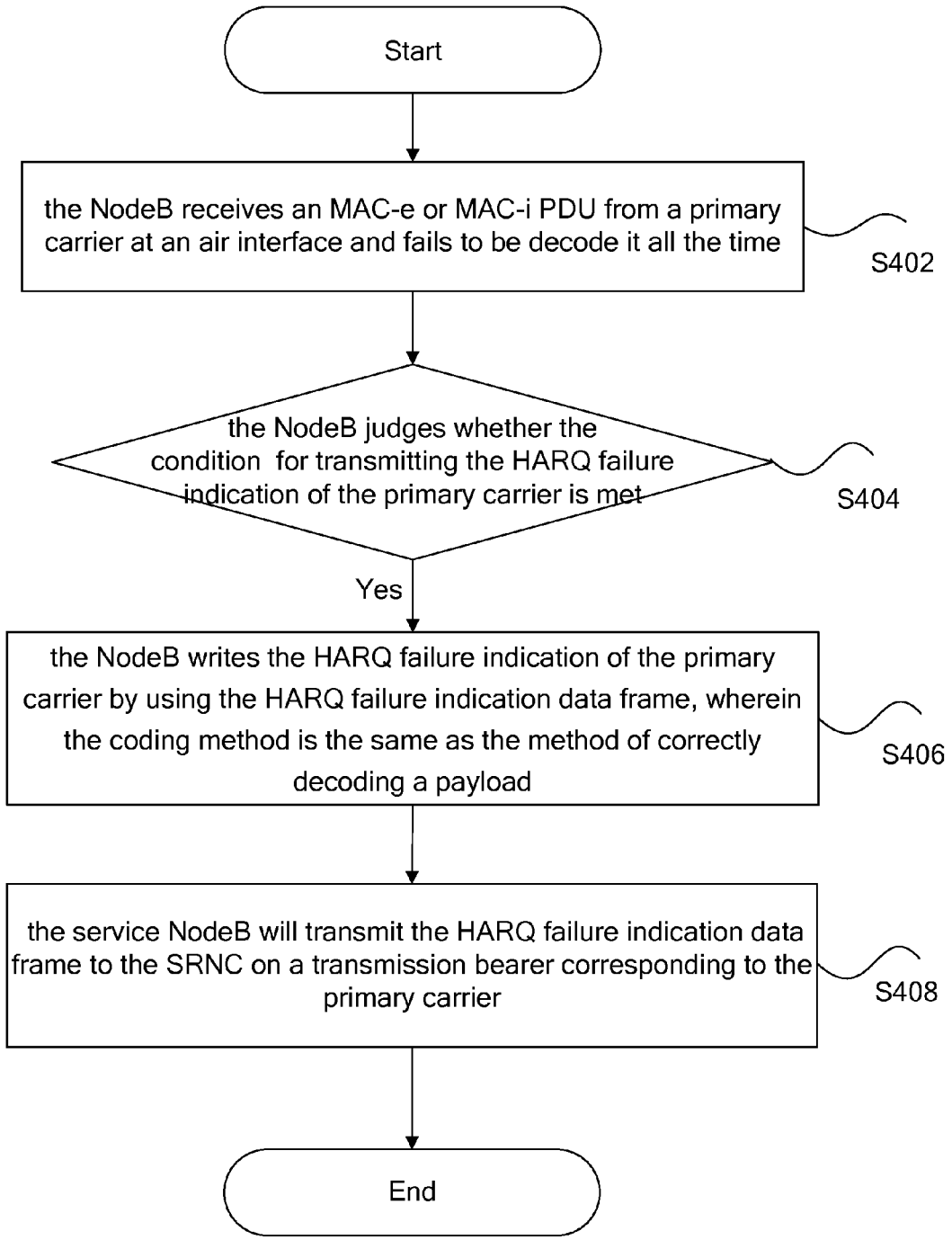
FIG. 4 is a schematic diagram according to Embodiment 1 of the present application.

FIG. 4 is a schematic diagram according to embodiment 1 of the present application. As shown in FIG. 4, a method for transmitting an HARQ failure indication data frame based on carriers of the present application is provided when it is necessary to transmit an HARQ failure indication data frame on a primary carrier. The processing procedure at the Node B includes the following steps 402 to 408:

step 402: the Node B receives one MAC-e or MAC-i PDU from the primary carrier at an air interface and fails to decode it all the time;

step 404: the Node B determines whether the conditions is met for transmitting an HARQ failure indication of the primary carrier, for an HARQ process of the primary carrier, step 406 will be executed when one MAC-e or MAC-i PDU cannot be decoded successfully, an RSN indicates a new MAC-e or MAC-i PDU transmission used for the same HARQ process of the primary carrier, and the number of HARQ retransmissions having happened is equal to or higher than the minimum value of the maximal HARQ retransmission value of the MAC-d flow configured by the terminal; or, step 406 will be executed when an MAC-e or MAC-i in an HARQ process of the primary carrier fails to be decoded all the time and the maximal retransmission of an MAC-d flow in the maximal retransmission of the highest HARQ which is available to the terminal connection occurs;

or, step 406 will be executed when the maximal retransmission of the MAC-d flow of the maximal retransmission of the highest HARQ which is available to the terminal connection should occur under the condition that the out-of-band signalling related to the HARQ on the E-DPCCH of the primary carrier cannot be decoded; or, step 406 will be executed when the Node B acquires the resetting time point of the MAC-e or MAC-i in the terminal through the upper layer, determines the MAC-e or MAC-i resetting to be executed in the terminal and thus know that the MAC-e or MAC-i in an HARQ process of the primary carrier fails to be decoded all the time;

step 406: the Node B writes the HARQ failure indication of the primary carrier by using the HARQ failure indication data frame, wherein the encoding method is the same as the method of correctly decoding a payload, the Node B writes the HARQ failure indication of the primary carrier by using the structure 1 of the HARQ failure indication data frame if an MAC-e PDU of a terminal received by the Node B from an air interface fails to be decoded all the time:

(1) writing a CFN and a subframe number when a failure is detected into the HARQ failure indication data frame;

(2) setting the number of the MAC-es PDUs as 0;

(3) setting the IEs of the number of HARQ retransmissions as the number of HARQ retransmissions having happened when a failure is detected;

or, the Node B writes the HARQ failure indication of the primary carrier by using the structure 2 of the HARQ failure indication data frame if an MAC-i PDU received by the Node B from an air interface fails to be decoded all the time:

(1) writing a CFN and a subframe number when a failure is detected into the HARQ failure indication data frame;

(2) setting the number of the MAC-is PDUs as 0;

(3) setting the IEs of the number of HARQ retransmissions as the number of HARQ retransmissions having happened when a failure is detected;

step 408: the service Node B will transmit the HARQ failure indication data frame to the SRNC on a transmission bearer corresponding to the primary carrier related to the terminal.

Table 1 is a table of a corresponding relationship between carriers and transmission bearers according to an embodiment of the present application. If the carrier is a primary carrier, the service Node B will transmit an HARQ failure indication data frame to the SRNC on the transmission bearer 1 corresponding to the primary carrier.

TABLE 1

| Carrier | Transmission bearer |
| --- | --- |
| Primary carrier | Transmission bearer 1 |
| secondary carrier | Transmission bearer 2 |

Embodiment 2

Figure 5:
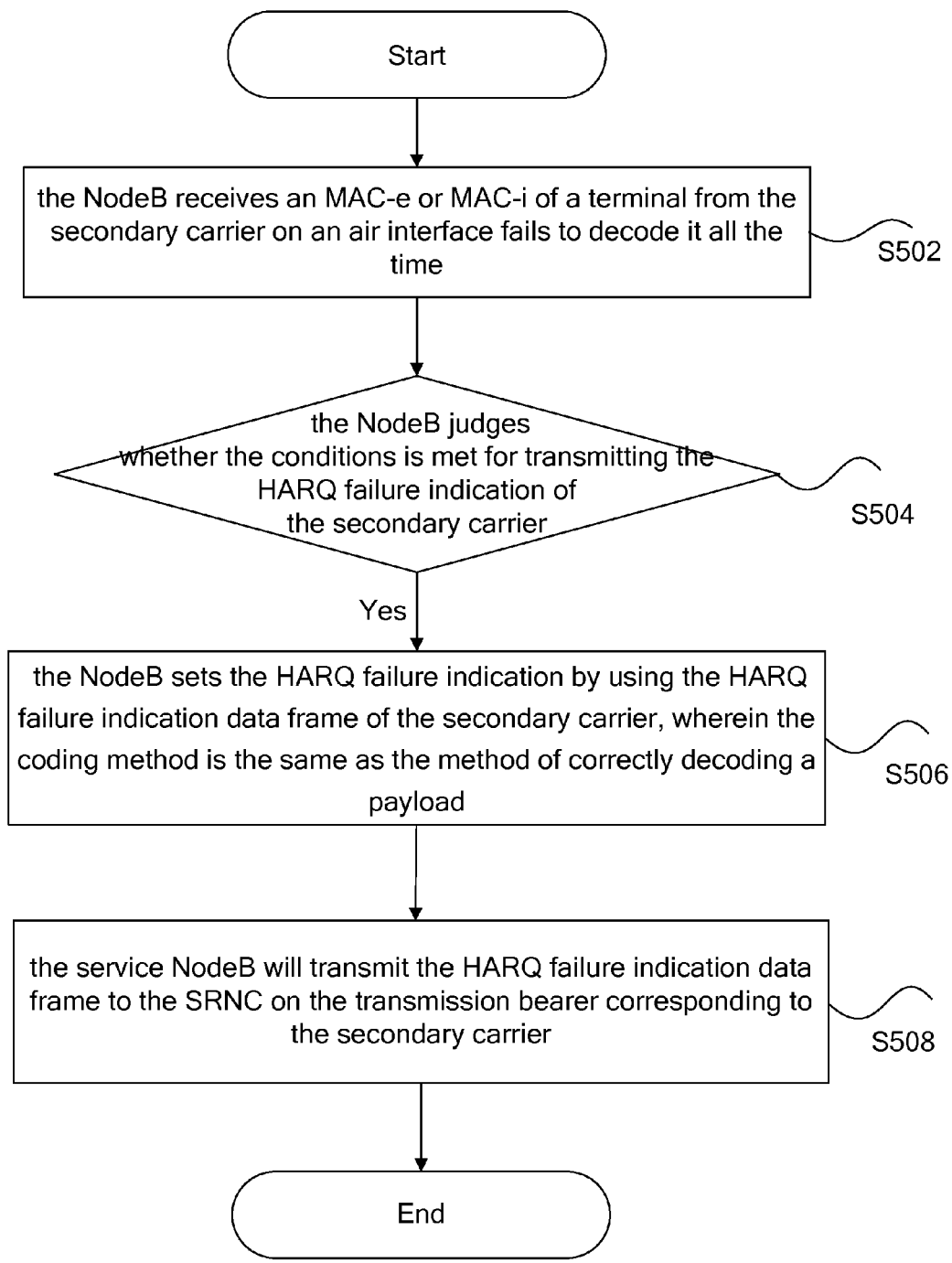
FIG. 5 is a schematic diagram according to Embodiment 2 of the present application.

FIG. 5 is a schematic diagram according to embodiment 2 of the present application. As shown in FIG. 5, a method for transmitting an HARQ failure indication data frame based on carriers of the present application is provided when it is necessary to transmit an HARQ failure indication data frame on a secondary carrier. The processing procedure at the Node B includes the following steps 502 to 508:

step 502: the Node B receives one MAC-e or MAC-i of a terminal from an secondary carrier on an air interface and fails to decode it all the time;

step 504: the Node B determines whether the condition for transmitting an HARQ failure indication on the secondary carrier is met, for an HARQ process of the secondary carrier, step 506 will be executed when one MAC-e or MAC-i PDU cannot be decoded successfully, an RSN indicates a new MAC-e or MAC-i PDU transmission used for the same HARQ process of the secondary carrier, and the number of HARQ retransmissions having happened is equal to or higher than the minimum value of the maximal HARQ retransmission value of the MAC-d flow configured by the terminal;

or, step 506 will be executed when one MAC-e or MAC-i in an HARQ process of the secondary carrier fails to be decoded all the time and the maximal retransmission of an MAC-d flow of the maximal retransmission of the highest HARQ which is available to the terminal connection occurs;

or, step 506 will be executed when the maximal retransmission of the MAC-d flow of maximal retransmission of the highest HARQ which is available to the terminal connection should occur under the condition that the out-of-band signalling (e.g. RSN) related to the HARQ on an E-DPCCH of the secondary carrier cannot be decoded;

or, step 506 will be executed when the Node B acquires the resetting time point of the MAC-e or MAC-i in the terminal through the upper layer and determines the MAC-e or MAC-I resetting to be executed in the terminal and thus knows that the MAC-e or MAC-i in the HARQ process of the secondary carrier fails to be decoded all the time;

step 506: the Node B sets the HARQ failure indication data frame of the secondary carrier by using the structure 1 or 2 of the HARQ failure indication data frame, wherein the encoding method is the same as the method of correctly decoding a payload, the Node B writes by using the structure 1 of the HARQ failure indication data frame if an MAC-e PDU received by the Node B from an air interface fails to be decoded all the time:

(1) writing a CFN and a subframe number when a failure is detected into the HARQ failure indication data frame;

(2) setting the number of the MAC-es PDUs as 0;

(3) setting the IEs of the number of HARQ retransmissions as the number of HARQ retransmissions having happened when a failure is detected;

or, the Node B writes by using the structure 2 of the HARQ failure indication data frame if an MAC-i PDU received by the Node B from an air interface fails to be decoded all the time:

(1) writing a CFN and a subframe number when a failure is detected into the HARQ failure indication data frame;

(2) setting the number of the MAC-is PDUs as 0;

(3) setting the IEs of the number of HARQ retransmissions as the number of HARQ retransmissions having happened when a failure is detected;

step 508: the service Node B will transmit the HARQ failure indication data frame to the SRNC on a transmission bearer corresponding to the secondary carrier related to the terminal.

According to Table 1, if the carrier is a secondary carrier, the service Node B will transmit the HARQ failure indication data frame to the SRNC on the transmission bearer 2 corresponding to the secondary carrier.

Embodiment 3

Figure 6:
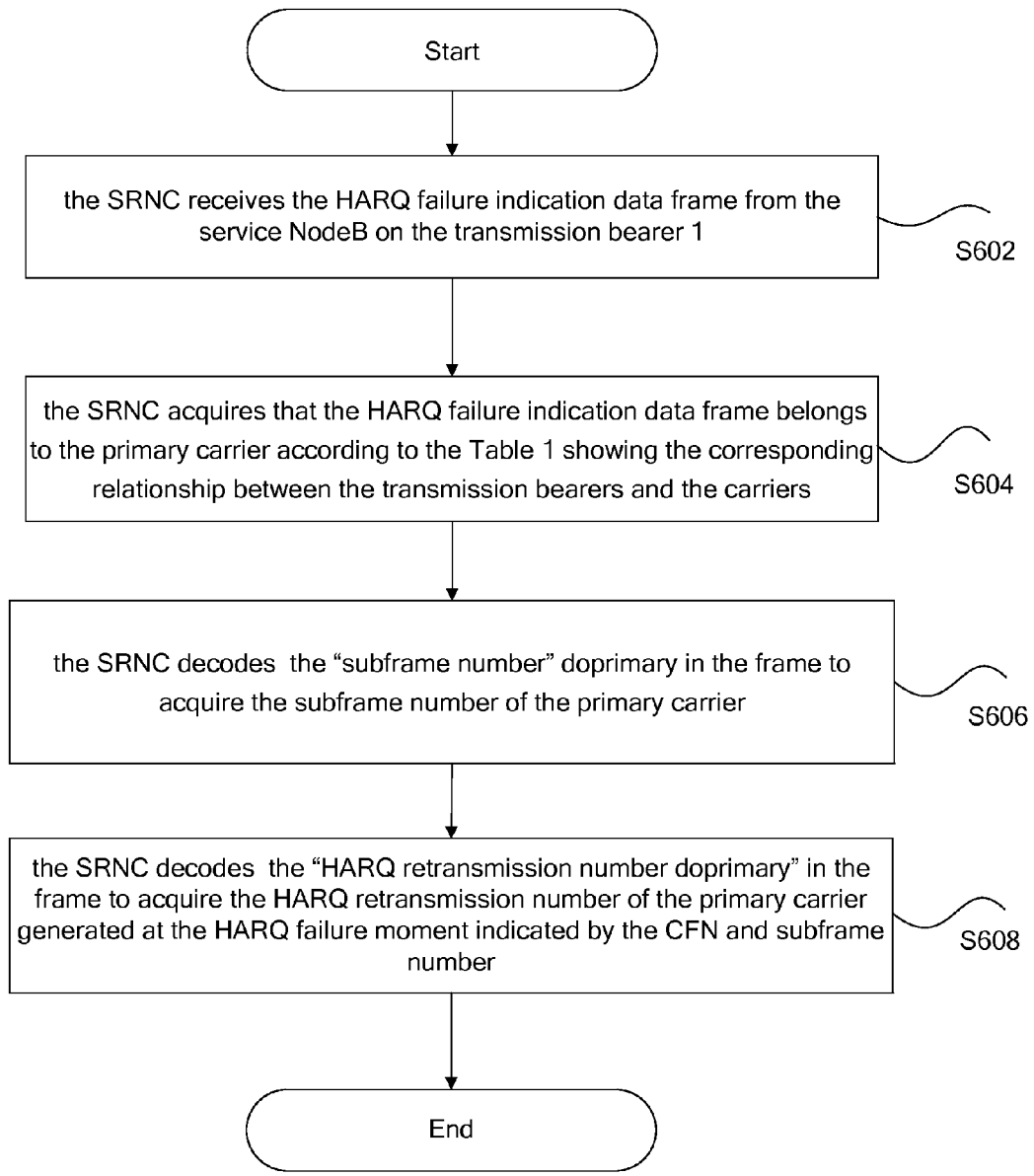
FIG. 6 is a schematic diagram according to Embodiment 3 of the present application.

FIG. 6 is a schematic diagram according to embodiment 3 of the present application. As shown in FIG. 6, a method for transmitting an HARQ failure indication data frame based on carriers of the present application is provided when an HARQ failure indication data frame is received from a primary carrier of the Node B. The processing procedure at the SRNC includes the following steps 602 to 608:

step 602: the SRNC receives an HARQ failure indication data frame from the service Node B on the transmission bearer 1;

step 604: the SRNC acquires that the HARQ failure indication data frame belongs to the primary carrier according to the Table 1 showing the corresponding relationship between transmission bearers and carriers;

step 606: the SRNC decodes the "subframe number" domain in the frame to acquire the subframe number of the primary carrier;

step 608: the SRNC decodes the "HARQ retransmission number" domain in the frame to acquire the number of HARQ retransmissions occurring at the HARQ failure moment indicated by the CFN and subframe number on the primary carrier.

Embodiment 4

Figure 7:
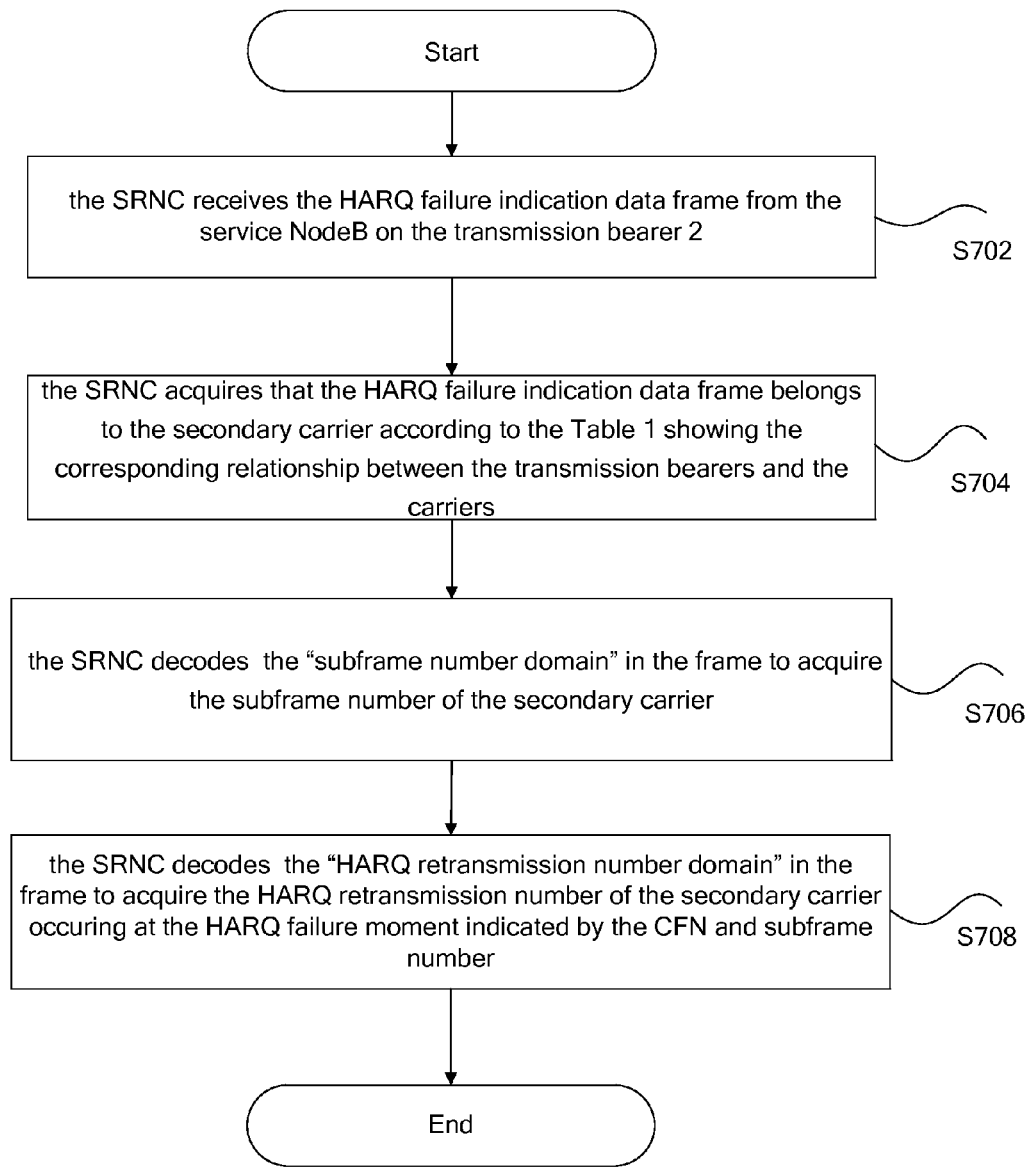
FIG. 7 is a schematic diagram according to Embodiment 4 of the present application.

FIG. 7 is a schematic diagram according to embodiment 4 of the present application. As shown in FIG. 7, a method for transmitting an HARQ failure indication data frame based on carriers of the present application is provided when an HARQ failure indication data frame is received from a secondary carrier of the Node B. The processing procedure at the SRNC includes the following steps 702 to 708:

step 702: the SRNC receives an HARQ failure indication data frame from the service Node B on the transmission bearer 2;

step 704: the SRNC acquires that the HARQ failure indication data frame belongs to the secondary carrier according to the Table 1 showing the corresponding relationship between transmission bearers and carriers;

step 706: the SRNC decodes the "subframe number" domain in the frame to acquire the subframe number of the secondary carrier;

step 708: the SRNC decodes the "HARQ retransmission number" domain in the frame to acquire the number of HARQ retransmissions occurring at the HARQ failure moment indicated by the CFN and subframe number on the secondary carrier.

APPARATUS EMBODIMENT

Embodiment 1

Figure 8:
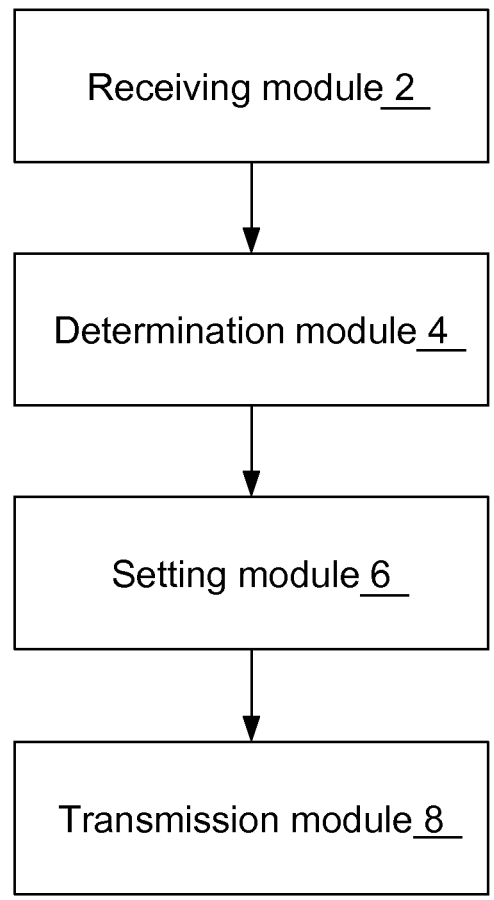
FIG. 8 is a block diagram of the structure of a Node B according to an embodiment of the present application.

According to an embodiment of the present application, a Node B is provided. FIG. 8 is a block diagram of the structure of the Node B according to an embodiment of the present application. As shown in FIG. 8, the apparatus includes: a receiving module 2, a determination module 4, a setting module 6 and a transmission module 8, which are described below:

the receiving module 2 is configured for receiving an E-DCH payload from a primary or secondary carrier, and the Node B fails to decode the E-DCH payload, wherein data flows of the primary and secondary carriers are transmitted on independent transmission bearers at a Iub interface/Iur interface; the determination module 4 is connected to the receiving module 2 and configured for determining whether the condition of transmitting an HARQ failure indication is met under the condition that the E-DCH payload received by the receiving module 2 fails to be decoded; the setting module 6 is connected to the determination module 4 and configured for setting the HARQ failure indication data frame on the primary or secondary carrier if the determination result from the determination module 4 is yes; and the transmission module 8 is connected to the setting module 6 and configured for transmitting the HARQ failure indication data frame set by the setting module to the SRNC on a transmission bearer corresponding to the primary or secondary carrier.

Wherein, the setting operation of the setting module 6 includes:

(1) setting a CFN and a subframe number when detecting an HARQ failure indication into a CFN domain and a subframe number domain;

(2) if the data frame is of type 1: setting 0 into a number domain of MAC-es PDUs, wherein there is correspondingly no IE of DDI and N in a data frame head; for the alignment of 8 bits, the last 4 padding bits of the IEs of the MAC-es PDU are used and there is also no MAC-es PDU in the payload part of the data frame related to the HARQ failure; or if the data frame is of type 2: setting 0 into the number domain of MAC-is PDUs, wherein there is correspondingly no IE of the MAC-is protocol data descriptor in the head, and there is no MAC-is PDU in the payload part of the data frame related to the HARQ failure;

(3) setting the number of HARQ retransmissions having happened when the HARQ failure indication is detected into an HARQ retransmission number domain.

Embodiment 2

Figure 9:
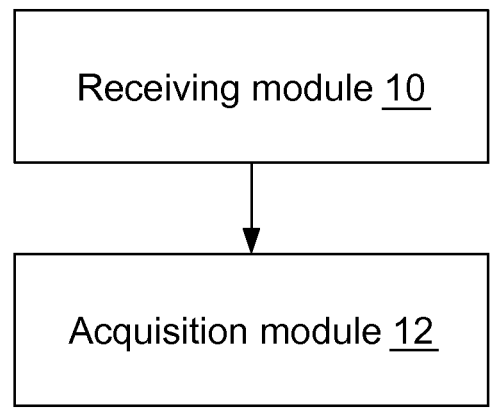
FIG. 9 is a block diagram of the structure of an SRNC according to an embodiment of the present application.

According to an embodiment of the present application, an SRNC is provided. FIG. 9 is a block diagram of the structure of the SRNC according to an embodiment of the present application. As shown in FIG. 9, the apparatus includes: a receiving module 10 and an acquisition module 12, which are described below:

the receiving module 10 is configured for receiving an HARQ failure indication data frame from a Node B on a transmission bearer corresponding to a primary or secondary carrier; and the acquisition module 12 is connected to the receiving module 10 and configured for acquiring information of an HARQ failure indication data frame of a primary or secondary carrier corresponding to a transmission bearer of a Iub interface/Iur interface from the HARQ failure indication data frame received by the receiving module 10.

Specifically, the acquisition operation of the acquisition module 12 includes: decoding the "CFN" domain of the frame to acquire the CFN of the carrier (primary/secondary) corresponding to the transmission bearer of the Iub interface/Iur interface; decoding the "subframe number" domain of the frame to acquire the subframe number of the carrier (primary/secondary) corresponding to the transmission bearer of the Iub interface/Iur interface; and decoding the "HARQ retransmission number" domain of the frame to acquire the number HARQ retransmissions occurring at the HARQ failure moment indicated by the CFN and subframe number on the carrier (primary/secondary) corresponding to the transmission bearer at the Iub interface/Iur interface.

To sum up, based on the embodiments of the present application, a method for transmitting/receiving a carrier-based HARQ failure indication is provided, and used for transmitting and receiving an HARQ failure indication when data are transmitted on dual carriers by using an HSPA technology in the radio communication system, transmitting an HARQ failure indication corresponding to each carrier, binding the HARQ failure indication with a transmission bearer corresponding to a carrier and transmitting the HARQ failure indication on a transmission bearer corresponding to a carrier through an HARQ failure indication data frame of an Iub interface/Iur interface and further transmitting it to the SRNC. In this way, the SRNC can know the number of HARQ retransmissions having happened when an HARQ failure indication occurs on each carrier, thus the SIR Target value can be better controlled through the carrier-based OLPC function. The defects of the prior art is therefore overcome. The carrier-based HARQ failure indication can be used for dual carriers to avoid an HARQ failure caused by a long-term low SIR target value. The present application makes little modification to the existing protocol and has backward compatibility.

Obviously, those skilled in the prior art shall understand that the modules or steps of the present application may be realized by general computing apparatus, they can be centralized in a single computing apparatus or distributed in a network consisting of multiple computing apparatuses; optionally, the modules or steps may be realized by program codes executable by computing apparatuses; thus, it may be realized by storing them in a storage apparatus to be executed by computing apparatuses, or manufacturing them into integrated circuit modules respectively or into a single integrated circuit module using multiple modules or steps thereof. In this way, the present application is not limited to any specific combination of hardware and software.

The above are only preferred embodiments of the present application and not used for limiting the present application. For those skilled in the art, the present application may have various modifications and changes. Any modifications, equivalent replacements, improvements and the like within the spirit and principle of the present application shall fall within the protection scope of the present application.

The invention claimed is:

1. A method for transmitting a Hybrid Automatic Repeat Request (HARQ) failure indication, applied to a process of transmitting data flows of a primary carrier and a secondary carrier on independent transmission bearers of a Iub interface/Iur interface respectively, comprising:

receiving an Enhanced Dedicated Transport Channel (E-DCH) payload from the primary carrier and failing to decode it by a Node B;

determining by the Node B whether a condition for transmitting an HARQ failure indication is met, if it is met, setting by the Node B an HARQ failure indication data frame on the primary carrier; and binding by the Node B the HARQ failure indication data frame with a transmission bearer corresponding to the primary carrier and transmitting by the Node B the HARQ failure indication data frame to a Service Radio Network Controller (SRNC) on the transmission bearer corresponding to the primary carrier;

wherein the setting an HARQ failure indication data frame on the primary carrier comprises:

setting a Connection Frame Number CFN domain and a subframe number domain as a CFN and a subframe number when detecting an HARQ failure indication;

if the data frame is of type 1, setting a number domain of Medium Access Control-enhanced sublayer Protocol Data Units (MAC-es PDUs) as 0, setting no IEs of DDI and N in the data frame head, for the alignment of 8 bits, using the last 4 padding bits of the IEs of the MAC-es PDU, and setting no MAC-es PDU in the payload part of the data frame related to the HARQ failure;

if the data frame is of type 2, setting a number domain of Medium Access Control-improved sublayer Protocol Data Units (MAC-is PDUs) as 0, setting no IEs of an MAC-is protocol data descriptor in the data frame head, setting no MAC-is PDU in the payload part of the data frame related to the HARQ failure; and setting an HARQ retransmission number domain as the number of HARQ retransmissions having happened when an HARQ failure indication is detected.

2. A method for transmitting an HARQ failure indication, applied to a process of transmitting data flows of a primary carrier and a secondary carrier on independent transmission bearers of a Iub interface/Iur interface respectively, comprising:

receiving an E-DCH payload from the secondary carrier and failing to decode it by a Node B;

determining by the Node B whether a condition for transmitting an HARQ failure indication is met, if it is met, setting by the Node B an HARQ failure indication data frame on the secondary carrier; and binding by the Node B the HARQ failure indication data frame with a transmission bearer corresponding to the secondary carrier and transmitting by the Node B the HARQ failure indication data frame to a Service Radio Network Controller (SRNC) on the transmission bearer corresponding to the secondary carrier;

wherein the setting an HARQ failure indication data frame on the secondary carrier comprises:

setting a Connection Frame Number (CFN) domain and a subframe number domain as a CFN and a subframe number when detecting an HARQ failure indication;

if the data frame is of type 1, setting a number domain of Medium Access Control-enhanced sublayer Protocol Data Units (MAC-es PDUs) as 0, setting no IEs of DDI and N in the data frame head, for the alignment of 8 bits, using the last 4 padding bits of the IEs of the MAC-es PDU, and setting no MAC-es PDU in the payload part of the data frame related to the HARQ failure;

if the data frame is of type 2, setting a number domain of Medium Access Control-improved sublayer Protocol Data Units (MAC-is PDUs) as 0, setting no IEs of an MAC-is protocol data descriptor in the data frame head, setting no MAC-is PDU in the payload part of the data frame related to the HARQ failure; and setting an HARQ retransmission number domain as the number of HARQ retransmissions having happened when an HARQ failure indication is detected.

3. A method for receiving an HARQ failure indication, applied to a process of transmitting data flows of a primary carrier and a secondary carrier on independent transmission bearers of a Iub interface/Iur interface respectively, comprising:

receiving by a Service Radio Network Controller (SRNC) an HARQ failure indication data frame from a Node B on a transmission bearer corresponding to the primary carrier and acquiring, by the SRNC, information of the HARQ failure indication data frame of the primary carrier corresponding to the transmission bearer of the Iub interface/Iur interface from the HARQ failure indication data frame and acquiring, by the SRNC, the HARQ failure indication data frame belongs to the primary carrier;

wherein the acquiring, by the SRNC, information of the HARQ failure indication data frame of the primary carrier corresponding to the transmission bearer of the Iub interface/Iur interface from the HARQ failure indication data frame comprises:

acquiring by the SRNC a CFN of the primary carrier from a CFN domain of the HARQ failure indication data frame;

acquiring by the SRNC a subframe number of the primary carrier from a subframe number domain of the HARQ failure indication data frame; and acquiring by the SRNC the number of HARQ retransmissions occurring on the primary carrier at an HARQ failure moment indicated by the CFN and the subframe number from an HARQ retransmission number domain in the HARQ failure indication data frame;

wherein there is correspondingly no IEs of DDI and N in the data frame head; for the alignment of 8 bits, the last 4 padding bits of the IEs of the MAC-es PDU are used and there is no MAC-es PDU in the payload part of the data frame related to the HARQ failure; or wherein there is correspondingly no IEs of an MAC-is protocol data descriptor in the data frame head, and there is no MAC-is PDU in the payload part of the data frame related to the HARQ failure.

4. A method for receiving an HARQ failure indication, applied to a process of transmitting data flows of a primary carrier and a secondary carrier on independent transmission bearers of a Iub interface/Iur interface respectively, comprising:

receiving by a Service Radio Network Controller (SRNC) an HARQ failure indication data frame from a Node B on a transmission bearer corresponding to the secondary carrier and acquiring, by the SRNC, information of the HARQ failure indication data frame of the secondary carrier corresponding to the transmission bearer of the Iub interface/Iur interface from the HARQ failure indication data frame and acquiring, by the SRNC, the HARQ failure indication data frame belongs to the secondary carrier;

wherein the acquiring, by the SRNC, information of the HARQ failure indication data frame of the secondary carrier corresponding to the transmission bearer of the Iub interface/Iur interface from the HARQ failure indication data frame comprises:

acquiring by the SRNC a CFN of the secondary carrier from a CFN domain of the HARQ failure indication data frame;

acquiring by the SRNC a subframe number of the secondary carrier from a subframe number domain of the HARQ failure indication data frame; and acquiring by the SRNC the number of HARQ retransmissions occurring on the secondary carrier at an HARQ failure moment indicated by the CFN and the subframe number from an HARQ retransmission number domain in the HARQ failure indication data frame;

wherein there is corresponding no IEs of DDI and N in the data frame head; for the alignment of 8 bits, the last 4 padding bits of the IEs of the MAC-es PDU are used and there is no MAC-es PDU in the payload part of the data frame related to the HARQ failure; or wherein there is corresponding no IEs of an MAC-is protocol data descriptor in the data frame head, and there is no MAC-is PDU in the payload part of the data frame related to the HARQ failure.

5. A node B comprising:

a receiving module, configured for receiving an E-DCH payload from a primary carrier or a secondary carrier, wherein data flows of the primary carrier and the secondary carrier are transmitted on independent transmission bearers of a Iub interface/Iur interface respectively;

a determination module, configured for determining whether a condition for transmitting an HARQ failure indication is met under the condition that the E-DCH payload received by the receiving module fails to be decoded;

a setting module, configured for setting an HARQ failure indication data frame on the primary carrier or the secondary carrier under the condition that the determination result from the determination module is yes; and a transmitting module, configured for binding the HARQ failure indication data frame with a transmission bearer corresponding to the primary carrier or the secondary carrier and transmitting the HARQ failure indication data frame set by the setting module to a Service Radio Network Controller (SRNC) on a transmission bearer corresponding to the primary carrier or the secondary carrier;

the setting module if further be configured for setting a Connection Frame Number CFN domain and a subframe number domain as a CFN and a subframe number when detecting an HARQ failure indication;

if the data frame is of type 1, setting a number domain of Medium Access Control-enhanced sublayer Protocol Data Units (MAC-es PDUs) as 0, setting no IEs of DDI and N in a data frame head, for the alignment of 8 bits, using the last 4 padding bits of the IEs of the MAC-es PDU, and setting no MAC-es PDU in the payload part of the data frame related to the HARQ failure;

if the data frame is of type 2, setting a number domain of Medium Access Control-improved sublayer Protocol Data Units (MAC-is PDUs) as 0, setting no IEs of an MAC-is protocol data descriptor in the head, setting no MAC-is PDU in the payload part of the data frame related to the HARQ failure.

6. A Service Radio Network Controller (SRNC) comprising:
- a receiving module, configured for receiving an HARQ failure indication data frame from a Node B on a transmission bearer corresponding to a primary carrier or a secondary carrier; and
- an acquisition module, configured for acquiring information of the HARQ failure indication data frame of the primary carrier or the secondary carrier corresponding to the transmission bearer of a Iub interface/Iur interface from the HARQ failure indication data frame received by the receiving module and acquiring the HARQ failure indication data frame belongs to the primary carrier or the secondary carrier;
- the acquisition module if further be configured for acquiring by the SRNC a CFN of the secondary carrier from a CFN domain of the HARQ failure indication data frame;
- acquiring by the SRNC a subframe number of the secondary carrier from a subframe number domain of the HARQ failure indication data frame; and
- acquiring by the SRNC the number of HARQ retransmissions occurring on the secondary carrier at an HARQ failure moment indicated by the CFN and the subframe number from an HARQ retransmission number domain in the HARQ failure indication data frame;
- wherein there is corresponding no IEs of DDI and N in the data frame head; for the alignment of 8 bits, the last 4 padding bits of the IEs of the MAC-es PDU are used and there is no MAC-es PDU in the payload part of the data frame related to the HARQ failure; or
- wherein there is correspondingly no IEs of an MAC-is protocol data descriptor in the data frame head, and there is no MAC-is PDU in the payload part of the data frame related to the HARQ failure.

* * * * *